(12) United States Patent
Rokugo et al.

(10) Patent No.: US 7,782,865 B2
(45) Date of Patent: Aug. 24, 2010

(54) ALLOCATING VPI FOR USER DEVICES

(75) Inventors: Yoshinori Rokugo, Tokyo (JP);
Hiroyuki Kikuchi, Miyagi (JP)

(73) Assignee: Juniper Networks, Inc., Sunnyvale, CA (US)

( * ) Notice: Subject to any disclaimer, the term of this patent is extended or adjusted under 35 U.S.C. 154(b) by 979 days.

(21) Appl. No.: 11/131,207

(22) Filed: May 18, 2005

(65) Prior Publication Data

US 2005/0207422 A1 Sep. 22, 2005

Related U.S. Application Data

(63) Continuation of application No. 09/506,366, filed on Feb. 18, 2000, now Pat. No. 6,934,291.

(30) Foreign Application Priority Data

Feb. 25, 1999 (JP) ................. 11-048165

(51) Int. Cl.
*H04L 12/28* (2006.01)
*H04L 12/56* (2006.01)

(52) U.S. Cl. ............................. 370/395.3

(58) Field of Classification Search ........... 370/395.1, 370/395.2, 395.3, 396, 397, 398, 399, 400, 370/409, 410, 393
See application file for complete search history.

(56) References Cited

U.S. PATENT DOCUMENTS

| | | | | |
|---|---|---|---|---|
| 5,339,318 A | * | 8/1994 | Tanaka et al. | 370/399 |
| 5,440,547 A | | 8/1995 | Easki et al. | 370/395.3 |
| 5,467,349 A | * | 11/1995 | Huey et al. | 370/397 |
| 5,483,525 A | * | 1/1996 | Song et al. | 370/392 |
| 5,568,479 A | * | 10/1996 | Watanabe et al. | 370/399 |
| 5,673,264 A | * | 9/1997 | Hamaguchi | 370/397 |
| 5,805,592 A | * | 9/1998 | Hatano | 370/395.7 |
| 5,872,786 A | | 2/1999 | Shobatake | 370/398 |
| 5,905,728 A | * | 5/1999 | Han et al. | 370/395.3 |
| 5,907,542 A | * | 5/1999 | Kuehnel et al. | 370/331 |
| 6,081,519 A | | 6/2000 | Petler | 370/356 |
| 6,084,876 A | * | 7/2000 | Kwok et al. | 370/379 |

(Continued)

FOREIGN PATENT DOCUMENTS

JP 5-122240 5/1993

(Continued)

OTHER PUBLICATIONS

Official Action in Chinese Patent Application No. 00105390.6.

*Primary Examiner*—Ayaz R Sheikh
*Assistant Examiner*—Hoang-Chuong Q Vu
(74) *Attorney, Agent, or Firm*—Harrity & Harrity, LLP

(57) ABSTRACT

To provide a method and network system, wherein the proper VPI values are allocated, after the user devices are connected with the network device. A user device transmits a first specific ATM cell, while a network device receives the first specific ATM cell and transmits toward the user device a second specific ATM cell which carries a proper VPI value in the information field of ATM cell. The proper VPI value in the second specific ATM cell is memorized and used by the user device for its own VPI value for communication.

19 Claims, 2 Drawing Sheets

U.S. PATENT DOCUMENTS

| | | | |
|---|---|---|---|
| 6,148,000 A | 11/2000 | Feldman et al. | 370/397 |
| 6,157,645 A * | 12/2000 | Shobatake | 370/395.41 |
| 6,208,655 B1 * | 3/2001 | Hodgins et al. | 370/397 |
| 6,252,870 B1 | 6/2001 | Fraas et al. | 370/353 |
| 6,327,266 B1 * | 12/2001 | Midani et al. | 370/466 |
| 6,430,197 B1 * | 8/2002 | Park | 370/471 |
| 6,473,411 B1 * | 10/2002 | Kumaki et al. | 370/331 |
| 6,480,492 B1 * | 11/2002 | Lundback et al. | 370/395.1 |
| 6,510,157 B2 * | 1/2003 | Kwok et al. | 370/395.2 |
| 6,553,014 B1 * | 4/2003 | Shobatake | 370/331 |
| 6,570,878 B2 * | 5/2003 | Cai et al. | 370/392 |
| 6,700,890 B1 * | 3/2004 | Langley et al. | 370/395.31 |
| 6,862,742 B2 * | 3/2005 | Komatsu et al. | 725/117 |
| 2002/0126674 A1 * | 9/2002 | Hemmady | 370/395.1 |
| 2003/0108048 A1 * | 6/2003 | Kwok et al. | 370/395.6 |

FOREIGN PATENT DOCUMENTS

| | | |
|---|---|---|
| JP | 7-74767 | 3/1995 |
| JP | 7-212370 | 8/1995 |
| JP | 7-264207 | 10/1995 |
| JP | 8-186573 | 7/1996 |
| JP | 2702429 | 10/1997 |
| JP | 9-511111 | 11/1997 |
| JP | 10-229406 | 8/1998 |
| WO | WO 99/07179 | 2/1999 |

* cited by examiner

| CH No. | VPI VALUE (LOWER 2 BITS) | FLAG |
|---|---|---|
| 1 | 00 | |
| | 01 | |
| | 10 | |
| | 11 | |
| 2 | ⋮ | ⋮ |
| ⋮ | ⋮ | ⋮ |

ALLOCATING VPI FOR USER DEVICES

RELATED APPLICATION

This application is a continuation of U.S. patent application Ser. No. 09/506,366 filed Feb. 18, 2000, now U.S. Pat. No. 6,934,291 the disclosure of which is incorporated herein by reference.

BACKGROUND OF THE INVENTION

1. Technical Field of the Invention

The present invention relates to a method for allocating VPI (Virtual Path Identifier) and an ATM (Asynchronous Transfer Mode) network system including a plurality of user devices connected with a network device.

2. Description of the Prior Art

It is necessary to allocate VPI values for both a network device and a plurality of user devices in order to transmit and receive ATM cells between them in an ATM network system, wherein the network device is connected with the user devices through network terminals (NT).

Therefore, the VPI values for the user devices must be allocated, when the user devices are installed.

There is disclosed in JPA 8-186573 (1986) a VPI conversion system in ATM subscriber line terminal equipment, wherein the conversion circuits for individual communication interfaces are common. Concretely, 12 Bit data for NNI (Network Node Interface) is generated by adding 4 Bit GFC (Generic Flow Control) to 8 Bit VPI data.

There is also disclosed in JPA 7-74767 (1995) a connectionless service equipment, wherein the connectionless services are offered to the users in a network system which transmits cells by multiplexing a plurality of connections.

There is also disclosed in Japanese Patent No. 2702429 a VPI conversion system in ATM user terminal station equipment, wherein the conversion circuits for individual communication interfaces are common.

There is also disclosed in JPA 9-511111 (1997) of the translated version of PCT/GB 95/00696 a B-ISDN (Broadband Integrated Service Digital Network) access, wherein network ports through which the users gain accesses to the network system can be increased.

There is also disclosed in JPA 10-229406 (1998) an ATM signaling method, wherein signaling cells including signaling VPI/VCI are exchanged between user terminals and call control terminals.

SUMMARY OF THE INVENTION

An object of the present invention is to provide a method for allocating VPI for the user devices, when a network device is connected with a plurality of user devices. The method of the present invention makes it unnecessary to allocate the VPI before installing the user devices.

Another object of the present invention is to provide a network system, wherein the VPI for the user devices can be allocated, after connecting the user devices with the network device.

The present invention relates to an ATM network system and method for allocating the VPI for a plurality of user devices or customer premises equipment.

Therefore, the present invention is different from the invention disclosed in JPA 8-186573 (1986), wherein identical conversion circuits are used for individual communication interfaces. The present invention relates to the VPI allocation.

The present invention is different from the invention disclosed in JPA 7-74767 (1995), wherein connectionless services are offered to the users. The present invention relates to the VPI allocation.

The present invention is different from the invention disclosed in Japanese Patent No. 2702429, wherein identical conversion circuits are used for individual communication interfaces. The present invention relates to the VPI allocation.

The present invention is different from the invention disclosed in JPA 9-511111 (1997), wherein network ports for users are increased in a B-ISDN access network. The present invention relates to the VPI allocation.

The present invention is different from the invention disclosed in JPA 10-229406 (1998), wherein signaling cells including signaling VPI/VCI are exchanged between user terminals and call control terminals. The present invention relates to the VPI allocation.

The ATM network system of the present invention comprises a network device and a plurality of user devices. Here, the network device receives a first specific ATM cell, and transmits a second specific ATM cell which is loaded with a proper VPI value on an information field, while a user device transmits the first specific ATM cell, receives the second specific ATM cell, and holds the proper VPI.

The user device may include a confirmation means for transmitting a third specific ATM cell, after holding the proper VPI, and for receiving a fourth specific ATM cell, while the network device may include a confirmation response means for transmitting a fourth specific ATM cell in response to the third specific ATM cell.

Further, the user device may include an initialization means for initializing the proper VPI, wherein said initialization means transmits a fifth specific ATM cell, and receives a sixth specific ATM cell. while the network device may include a transmission means for transmitting the sixth specific ATM cell in response to the fifth specific ATM cell.

Further, the user device may include an initialization confirmation means for transmitting a seventh specific ATM cell, after initializing the proper VPI, and for receiving an eighth specific ATM cell, while the network device may include an initialization confirmation response means for transmitting the eighth specific ATM cell in response to the seventh specific ATM cell.

Furthermore, a number of the user devices connected with channels of the network device may be limited within a prescribed number. Further, the proper VPI is made different from each other within the same channel of the network device.

Furthermore, the transmission means of the network device may transmit in response to the fifth specific ATM cell the sixth specific ATM cell towards all of the user devices which are connected with a channel of the network.

Furthermore, the user device may transmit the first specific ATM cell, after completing a connection with the network device.

Furthermore, the specific ATM cell may have a specific VPI and VCI in a cell header.

The VPI allocation method of the present invention comprises the steps of: a first transmission step for transmitting a first specific ATM cell from a user device to the network device; a second transmission step for transmitting in response to the first specific ATM cell a second specific ATM cell loaded with a proper VPI in its information field, from the network device to the user device; and a holding step for holding the proper VPI in the user device, after receiving the second specific ATM cell.

Further, the VPI allocation method may include the steps of: a third transmission step for transmitting a third specific ATM cell for notifying an arrival of the proper VPI, from the user device to the network device; a fourth transmission step for transmitting a fourth specific ATM cell from the network device to the user device, in response to the third specific ATM cell; and a receiving step for receiving the fourth specific ATM cell at the user device.

Further, the VPI allocation method may include the steps of: a fifth transmission step for transmitting, from the user device to the network device, a fifth specific ATM cell for requesting an initialization of the proper VPI; a sixth transmission step for transmitting from the network device to the user device a sixth specific ATM cell for permitting the request, in response to the fifth specific ATM cell; and an initializing step for initializing the proper VPI held by the user device.

Further, the VPI allocation method may include the steps of: a seventh transmission step for transmitting a seven specific ATM cell for notifying an execution of the initialization, from the user device towards the network device, after the initializing step; an eighth transmission step for transmitting an eighth specific ATM cell from the network device to the user device, in response to the seventh specific ATM cell; and a receiving step for receiving the eighth specific ATM cell at the user cell.

Furthermore, in the VPI allocation method, the proper VPI is made different from each other within the same channel of the network device.

Furthermore, the VPI allocation method of the present invention may include the steps of: a fifth transmission step for transmitting a fifth specific ATM cell for requesting an initialization of the proper VPI, from the user device towards the network device; a sixth transmission step for transmitting a sixth specific ATM cell for permitting the request, from the network device to all of the user devices which are connected with a channel of the network; and an initializing step for initializing the proper VPI held by the user device.

Furthermore, in the VPI allocation method, the first specific ATM cell may be transmitted after completing a connection with the network device.

Furthermore, in the VPI allocation method, the specific ATM cell may have a specific VPI and a specific VCI in a cell header.

Furthermore, the VPI allocation method may include a step for connecting the network device and the user devices.

Furthermore, the VPI allocation method of the present invention may include a step for holding the VPI value in common.

Furthermore, the VPI allocation method may include a step for initializing the VPI once held in common by the network device and the user devices.

According to the present invention, it becomes unnecessary to prepare the proper VPI values in advance before installing the user devices. In the present invention, the proper VPI values are allocated, after the user devices are connected with the network device.

Further, according to the present invention, a network system is provided, wherein the proper VPI values can be allocated, after the user devices are connected with the network device.

PREFERRED EMBODIMENT OF THE INVENTION

Figure 1:
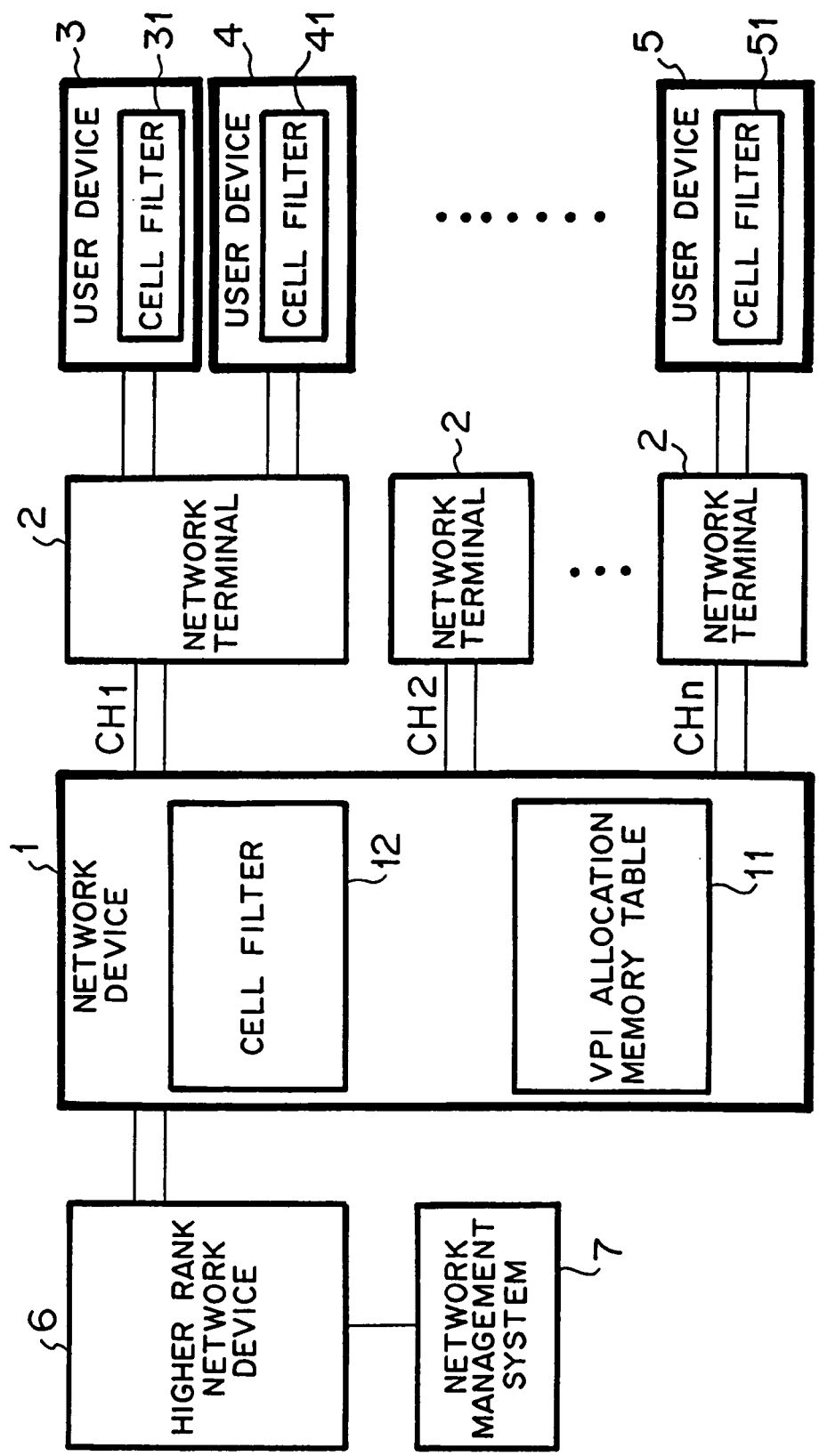
FIG. 1 is a block diagram of the network system of the present invention.

Modes of embodiment of the present invention are explained, referring to the drawings.

A block diagram of the network system of the present invention is shown in FIG. 1.

As shown in FIG. 1, the network system of the present invention comprises network device 1, a plurality of network terminals 2 (NT), a plurality of user devices 3, 4, and 5, higher rank network device 6, and network management system 7.

Network device 1 comprises VPI allocation memory table 11 and cell filter 12 which stores the VPI of user devices 3, 4, and 5. Network device 1 is connected with user device (1) 3, user device (2) 4, and user device (k) 5 through network terminals 2 (NT). Further, network device 1 is connected with higher rank network device 6.

Higher rank network device 6 manages all the VPI values allocated to the channels (CH) of network device 1.

Network management system 7 is connected to higher rank network device 6, in order to manage the whole network system. Concretely, network management system 7 manages the VPI of each port of higher rank network device 6.

User device (1) 3, user device (2) 4, and user device (k) 5 include cell filters 31, 41, and 51, respectively. Cell filters 31, 41, or 51 store the proper VPI which are allocated to user device (1) 3, user device (2) 4, and user device (k) 5.

User device 3, 4, or 5 as customer premises equipment must have its own Virtual Path (VP) identified by the VPI.

Here, network device 1 and user devices 3, 4, and 5 are explained, concerning the initial allocation of the VPI.

First, network device 1 is explained.

Network device 1 receives the specific ATM cells from user devices 3, 4, and 5. Here the specific ATM cell may have a specific VPI and a specific VCI in its header. Then, after loading a VPI value proper to each user device in the information field of each of the specific ATM cells, the network device 1 transmits the specific ATM cell including the proper VPI to each user device. The proper VPI is used as a communication VPI proper to user devices 3, 4, or 5.

Then, network device 1 memorizes the communication VPI values which are managed by a non-shown CPU and are recorded in cell filter 12.

VCI (Virtual Channel Identifier) is an identifier for identifying a point to point connection between a user device and another user device as well as for identifying a point to multipoint connection between a user device and a plurality of user devices.

Next, user devices 3, 4, and 5 are explained.

User device 3, 4, or 5 transmit toward network device 1 its request for the allocation of its own VPI values, by transmitting a specific ATM cell. This is for assuring the communication VPI proper to each of user device 3, 4, or 5.

In response to the requests, network device 1 transmits the proper VPI which are loaded on the information fields of ATM cell. Afterwards, the proper VPI values are kept by user devices 3, 4, and 5.

The proper VPI values allocated to user devices 3, 4, and 5 are managed by non-shown CPUs of user devices 3, 4, and 5, and are recorded in cell filters 31, 41, and 51.

After such allocation procedures, the allocations are confirmed by exchanging the ATM cells.

An example of the confirmation of the allocation procedure is explained hereinafter.

First, user device 3, 4, or 5 transmits toward network device 1 a specific ATM cell which contains data for confirming the arrival of the proper VPI.

Then, after receiving the ATM cell for the confirmation from user device 3, 4, or 5, network device 1 transmits toward user device 3, 4, or 5 a specific ATM cell which contains data for responding to the confirmation from user device 3, 4, or 5.

Next, release procedure of the proper VPI once allocated to user devices 3, 4, and 5 is explained.

First, user device 3, 4, or 5 requests to release the proper VPI value by transmitting toward network device 1 a specific ATM cell which contains data for requesting the release.

After receiving the ATM cells for the release request, network device 1 initializes the communication VPI stored in cell filter 12. Then, network device 1 transmits, toward the user device who requested the release, a specific ATM cell which contains in its information field other specific data for indicating that the release has been executed.

Further, after receiving the specific ATM cell which notifies the execution of release, the user device initializes its cell filter 31, 41, or 51.

The object of the initialization by network device 1 is not limited to the user device which requests the release of its proper VPI. The object of the initialization may be not only all the user devices which are connected with a channel of network device 1, but also all the user devices which are connected with network device 1.

The release or initialization of the proper VPI is completed by a confirmation procedure similar to that for the initial allocation of VPI.

A network system as shown in FIG. 1 is based on the FTTC (Fiber To The Curve) in DAVIC (Digital Audio Video Council) 1.0 part 8. A mode of embodiment of the present invention according to FTTC is explained hereinafter.

User devices or customer premises equipment are supported by FTTC described in DAVIC 1.0 Part 8, wherein the network terminals which terminate the distribution cables outside the users' houses are passive. The network terminals 2 (NT) connect maximum 4 user devices and branch telephone lines.

Network terminal (NT) 2 is connected channel by channel with network device 1. The maximum of user devices 3, 4, and 5 connected with network terminal (NT) 2 is four.

Network device 1 is provided with VPI allocation memory table 11 for memorizing the allocation of the VPI.

Figures 2, 3:
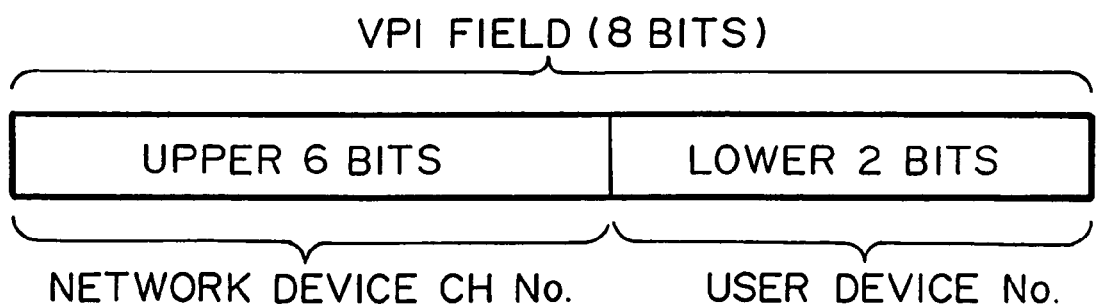
FIG. 2 is an example of VPI allocation memory table in network device included in the network system of the present invention.
FIG. 3 is a data frame for VPI allocation of the present invention.

An example of VPI allocation memory table is shown in FIG. 2. As shown in FIG. 2, VPI allocation memory table includes maximum four communication VPI values of 2 Bits (00-11) every channel of network device 1, and flags for indicating whether the proper VPI value is allocated or not. For example, when the flag is "0", the proper VPI of the user device connected with the corresponding channel is not allocated. On the other hand, when the flag is "1", the proper VPI of the user device connected with the corresponding channel is allocated.

Next, the communication VPI value is explained.

An example of the communication VPI value is shown in FIG. 3.

The communication VPI or proper VPI contains 8 Bits in the VPI field of the UNI (User Network Interface). The 8 Bits are divided into the upper 6 Bits and the lower 2 Bits. Here, the upper 6 Bits are used for identifying the channel (CH) number, while the lower 2 bits are used for identifying user devices 3, 4, and 5. The lower 2 Bits are the communication VPI value in the VPI allocation memory table 11. Therefore, the maximum of the channels becomes "64" and the maximum of user devices becomes "4".

Next, the operation of network device 1 is explained.

Network device 1 receives the ATM cell transmitted by user devices 3, 4, or 5. Then, network device 1 loads the communication VPI values of 00-11 (1-4 in decimal) on the information field of ATM. Then, network device 1 transmits toward user devices 3, 4, or 5 the ATM cell with specific VPI/VCI containing the communication VPI. Thus, the communication VPI or proper VPI is initially allocated.

The specific VPI/VCI value in the header of the specific ATM cell may be, for example, "0" for the VPI and "21" temporarily for the VCI.

In this case, all the upper 6 Bits are zero in the ATM cells transmitted by network device 1. On the other hand, the upper 6 Bits of the ATM cell transmitted by user devices 3, 4, or 5 are the CH number of network device 1. Network device 1 discards both the ATMs cell with "0" VPI and "21" VCI and idle cells from user devices 3, 4, or 5.

Next, the operation of user devices 3, 4, and 5 is explained.

At first time, user devices 3, 4, or 5 communicates with network device 1 by using the ATM cell with "0" VPI and "21" VCI. Then, user devices 3, 4, or 5 employ the proper VPI memorized in cell filter 31, 41, or 51. Therefore, the memorized proper VPI values become their communication VPI values for accessing to network device 1. The ATM cells are received or discarded by user devices 3, 4, or 5. on the basis of the memorized communication VPI.

Next, the procedure necessary for allocating and releasing the communication VPI is explained more concretely.

At first, the procedure necessary for allocating the communication VPI is explained.

VPI allocation memory table 11 is managed channel by channel and is rewritable. The VPI values 00-11 (1-4 in decimal) are memorized in the table 11.

At the initial set-up of user devices 3, 4, or 5, Sign-on defined in DAVIC 1.0 Part 8 is established between network device 1 and user device 3, 4, or 5. Then, user devices 3, 4, or 5 loads on the information field of the specific ATM cell the Device ID acquired from network device 1 at Sign-on. Then, user device 3, 4, or 5 request the allocation of the communication VPI value by transmitting the ATM cell with "0" VPI, "21" VCI and the Device ID.

Network device 1 detects the Device ID and decides 2 Bit proper VPI value to be allocated, referring to the proper VPI values already allocated and memorized in VPI allocation table 11. At this time, 00, 01, 10, and 11 are allocated in this order. Then, network device 1 responds to the request by transmitting towards user devices 3, 4, or 5 the ATM cell with "0" VPI, "21" VCI which are further loaded with the Device IDs and the newly allocated proper VPI values on the information field.

User device 3, 4, or 5 receives the ATM cell with "0" VPI, "21" VCI, confirms its own Device ID, and detects the newly allocated proper VPI loaded on the information field of the ATM cell. Thus, user device 3, 4, or 5 obtains its own communication VPI. Then, user device 3, 4, or 5 transmits an ATM cell with "0" VPI and "21" VCI in order to confirm the arrivals of the propre VPI or communication VPI. The confirmation message which notifies the arrival of the communication VPI is loaded together with the Device ID on the information field of the ATM cell. Here, A prescribed region of the ATM cell may be used as a data region for the arrival confirmation. Further, a prescribed 1 Bit in the ATM cell may be used for the arrival confirmation in such a manner that "1" stands for the arrival and "0" stands for the other case.

A series of procedures for the arrival confirmation are ended, when network device 1 transmits the ATM cell with "0" VPI and "21" VCI in response to the confirmation of arrival from user devices 3, 4, or 5, by inspecting the Device ID in the ATM cells with "0" VPI and "21" VCI from user device 3, 4, or 5. Here, a prescribed region of the ATM cell may be used as a data region for the response. Further, a prescribed 1 Bit in the ATM cell may be used for the response in such a manner that "1" stands for the arrival and "0" stands for the other case.

When the procedure for the arrival confirmation is ended, network device 1 memorizes the newly allocated communication VPI which are managed by a non-shown CPU in network device 1 and are recorded in a non-shown memory region in network device 1. The CPU also manages user devices 3, 4, and 5.

After completion of the arrival confirmation, user devices 3, 4, or 5 executes communication by using the newly allocated communication VPI which are managed by non-shown CPUs in user devices 3, 4, and 5, respectively and are recorded in non-shown memory regions in user devices 3, 4, and 5.

Next, the procedure for releasing the allocated communication VPI are explained again more concretely.

When user device 3, 4, or 5 in users' houses wants for some reasons to establish again the communication VPI, user device 3, 4, or 5 executes the following release procedure.

User device 3, 4, or 5 asks network device 1 for the release by using an ATM cell with "0" VPI and "21" VCI in the header. A prescribed region or a bit in the ATM cell may be used for the request of the release in the same way as in the arrival confirmation. At this step of procedure, all the user devices connected with the same channel of the network device 1 must be switched on or turned on.

When network device 1 receives the request from user device 3, 4, or 5, network device 1 initializes the communication VPI values in the relevant channel (CH) in VPI allocation memory table 11.

Then, network device 1 notifies user device 3, 4, or 5 of the initialization of VPI allocation memory table 11, by using the ATM cell with "0" VPI and "21" VCI. A prescribed region or a bit in the ATM cell may be used for the notification of the initialization.

Then, when user device 3, 4, or 5 receives the notification of the initialization from network device 1, user device 3, 4, or 5 lets network device 1 know that user device 3, 4, or 5 has received the notification, by using the ATM cell with "0" VPI and "21" VCI.

Network device 1 also notifies higher rank network device 6 of the release or initialization of the communication VPI values in the relevant channel. Thus, the communication VPI values restores the initial installation state.

It is not necessary to prepare in advance before installation the VPI values proper to network device 1 and user devices 3, 4, or 5, because in the network system of the present invention the proper VPI values are allocated after the installation of user devices 3, 4, and 5.

The specific VPI/VCI attached to the ATM cell for request and release of allocation may be any other values, although they are fixed to "0"/"21" as an example.

Nevertheless, "0" VPI is particularly suitable, because "0" VPI in the header is used for signaling in ATM communication.

What is claimed is:

1. A method, comprising:
receiving, over a first channel and at a network device, a first virtual path identifier allocation request from a first user device of a plurality of user devices, the request including a device identifier associated with the network device;
allocating a first device number to the first user device from a first plurality of available device numbers, where the first plurality of available device numbers are associated with the first channel, and where the first device number includes a first virtual path identifier;
sending a data unit to the first user device, where the data unit comprises a first virtual path identifier field that includes an identifier associated with the first channel concatenated with the allocated first device number;
receiving, over the first channel and at the network device, a virtual path identifier release request from the first user device;
de-allocating, by the network device, the first device number, of the first plurality of available device numbers associated with the first channel, based on the release request; and
sending, by the network device, a confirmation message to the first user device confirming de-allocation of the first virtual path identifier.

2. The method of claim 1, further comprising:
receiving, over the first channel and at the network device, a second virtual path identifier allocation request from a second user device, the second request including the device identifier associated with the network device;
allocating a second device number to the second user device from the first plurality of available device numbers, where the second device number includes the first virtual path identifier; and
sending a second data unit to the second user device, where the second data unit comprises a second virtual path identifier field that includes the identifier associated with the first channel concatenated with the allocated second device number.

3. The method of claim 1, further comprising:
using the first virtual path identifier to filter data units received from the plurality of user devices.

4. The method of claim 3, where using the first virtual path identifier to filter data units comprises:
processing data units that include the first virtual path identifier.

5. The method of claim 4 where using the first virtual path identifier to filter data units further comprises:
discarding data units that include virtual path identifiers that do not match the first virtual path identifier.

6. The method of claim 1, further comprising:
maintaining a table that stores virtual path identifiers; and
flagging an entry in the table, that corresponds to the first virtual path identifier, to indicate that the first virtual path identifier has been allocated.

7. A network device, comprising:
a memory to store a data structure, the data structure comprising:
a first field that includes a first channel number associated with the network device,
a second field that includes a first plurality of user device numbers, associated with first user devices that request virtual path identifiers from the network device, indexed to the first channel number, and a third field that includes a plurality of flag values associated with each of the user device numbers of the first plurality of user device numbers;

a fourth field that includes a second channel number associated with the network device, and a fifth field that includes a second plurality of user device numbers associated with second user devices that request virtual path identifiers from the network device, indexed to the second channel number, where the plurality of flag values of the third field is further associated with each of the user device numbers of the second plurality of user device numbers;

a receiver to receive virtual path identifier allocation requests from user devices; and a processor to:
allocate a device number, including a virtual path identifier, of the first plurality of user device numbers or the second plurality of user device numbers to each of the user devices using information in the first, second, third, fourth and fifth fields, and send a data unit to each of the user devices, where each data unit comprises a first virtual path identifier field that includes:
the first channel number concatenated with the allocated device number of the first plurality of user device numbers, or
the second channel number concatenated with the allocated device number of the second plurality of user device numbers.

8. The network device of claim 7, where the processor is to allocate a device number of the second plurality of user device numbers to each of the user devices further using the fourth and fifth fields.

9. The network device of claim 7, where the processor sets a selected one of the flag values corresponding to the allocated device number of the first plurality of user device numbers or the allocated device number of the second plurality of user device numbers.

10. A method, comprising:
receiving, at a user device, a device identifier from a remote network device over a channel;
sending, in response to the receiving the device identifier, a virtual path identifier allocation request to the remote network device from the user device over the channel, the request including the device identifier;
receiving, in response to sending the virtual path identifier allocation request, a data unit at the user device, where the data unit comprises a first virtual path identifier field that includes an identifier associated with the channel concatenated with a device number allocated to the user device from a plurality of available device numbers associated with the channel;
sending, by the user device and to the remote network device, a virtual path identifier release request over the channel to de-allocate the allocated device number associated with the channel; and
receiving, by the user device, a confirmation from the network device that the allocated device number is de-allocated based on the release request.

11. The method of claim 10, further comprising:
using the virtual path identifier to filter data units received from the remote network device.

12. The method of claim 11, where using the virtual path identifier to filter data units comprises:
processing data units that include the virtual path identifier.

13. The method of claim 12, where using the virtual path identifier to filter data units further comprises:
discarding data units that include virtual path identifiers that do not correspond to the virtual path identifier.

14. A method, comprising:
allocating a first device number, to a first user device, from a first plurality of available device numbers associated with a first channel, where the first user device communicates via the first channel;
sending, from a network device and to the user device, an asynchronous transfer mode (ATM) cell, where the ATM cell comprises a virtual path identifier field that includes an identifier associated with the first channel concatenated with a first virtual path identifier, where the first virtual path identifier includes the allocated first device number;
sending a data unit from the first user device to the network device, where the data unit includes a confirmation message and the first device number;
receiving, over the first channel and at the network device, a virtual path identifier release request from the first user device;
de-allocating, by the network device, the first device number, of the first plurality of available device numbers associated with the first channel, based on the release request; and
sending, by the network device, a confirmation message to the first user device confirming de-allocation of the first virtual path identifier.

15. The method of claim 14, further comprising:
allocating a second device number to a second user device from the first plurality of available device numbers associated with the first channel; and
sending, from the network device and to the second user device, an asynchronous transfer mode (ATM) cell, where the ATM cell comprises a virtual path identifier field that includes an identifier associated with the first channel concatenated with a second virtual path identifier to the second user device, where the second virtual path identifier comprises the allocated second device number.

16. The method of claim 14, further comprising:
using the first virtual path identifier to filter data units received from a plurality of user devices, where the plurality of user devices includes the first user device.

17. The method of claim 16, where using the first virtual path identifier to filter data units comprises:
processing data units that include the first virtual path identifier.

18. The method of claim 17, where using the first virtual path identifier to filter data units further comprises:
discarding data units that include virtual path identifiers that do not match the first virtual path identifier.

19. The method of claim 14, further comprising:
maintaining a table that stores virtual path identifiers; and
notating an entry in the table that corresponds to the first virtual path identifier to indicate that the first virtual path identifier has been allocated.

* * * * *